March 11, 1952  S. PORTER  2,588,571
METHOD FOR FORMING HOLLOW ARTICLES
Filed Oct. 24, 1950
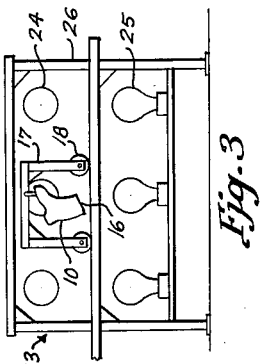
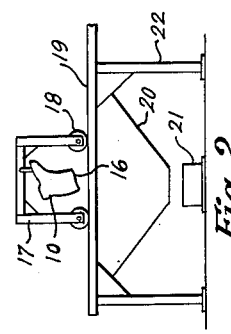
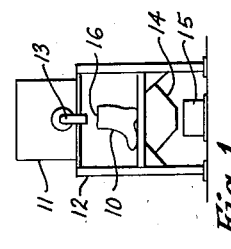
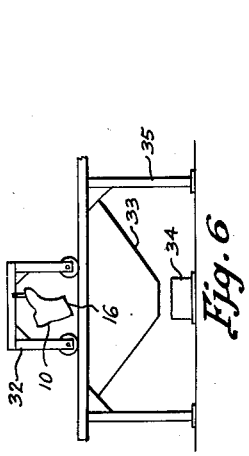
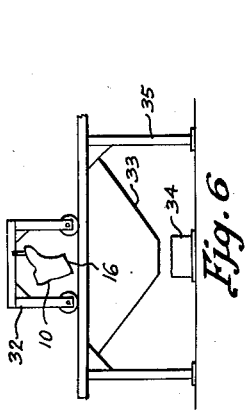
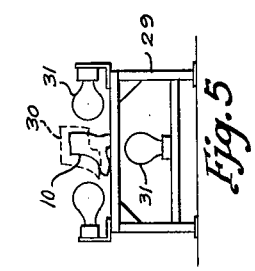
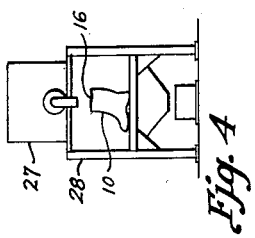
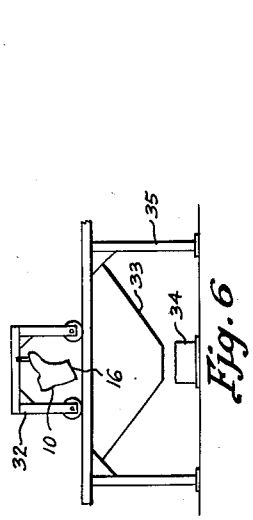
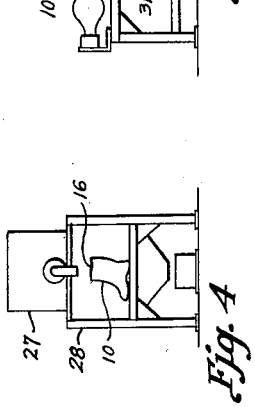
Inventor
SYDNEY PORTER
By: Featherstonhaugh & Co.
Att'ys Patented Mar. 11, 1952

2,588,571

UNITED STATES PATENT OFFICE 2,588,571

METHOD FOR FORMING HOLLOW ARTICLES

Sydney Porter, Toronto, Ontario, Canada, assignor, by direct and mesne assignments, to Elastine Process & Development Ltd., Toronto, Ontario, Canada, a company of Ontario Application October 24, 1950, Serial No. 191,740

7 Claims. (Cl. 18—47.5)

This invention relates to a method of forming hollow articles of elastic character such as waterproof footwear or the like.

According to the invention a moulding material having physical characteristics of a heavy cream-like consistency while in the uncured state and which when cured by means of heating results in an elastic-like material is introduced while in the liquid state into the open end of a one-piece uniformly thin-walled metal mould. The mould is of a form defining in its inner surfaces the exterior contours of the article to be moulded. The liquid material is poured into the mould to the depth of the article to be formed and then exterior heating is applied to the mould to cause curing of the material therein to form a partially cured layer. The heating is controlled over selected areas to cause a build-up of the material at points where reinforcing is desired and the heating is continued until the desired build-up has been accomplished. The heating is not continued at this stage to final cure of the coating inside the mould, but first the heating step is interrupted to allow the excess uncured liquid to be poured from the mould. Thereafter, the coating within the mould of controlled depth in selected areas is subjected to further and final heating to complete the cure so that the article is wholly formed within the mould. After final curing, the wholly formed article is pulled from the mould, the elastic character of the cured material assisting removal through the opening of the mould.

Another object of the invention is to provide a method as before wherein the interior of the hollow article may be treated in various ways while in the mould, such as by adding thereto cloth or other materials for suitable interior surface characteristics and including flocking fibrous material.

A still further object of the invention is to provide a method of producing elastic hollow articles as before and which is particularly adaptable to the manufacture of waterproof footwear and the like, and which results in a particularly cheap mode of manufacture for such articles requiring a minimum of manufacturing operations.

Other objects of the invention will be appreciated by a study of the following specification taken in conjunction with the accompanying drawings. The drawings illustrate in numerical sequence various operations according to the method herein and wherein, Figure 1 illustrates the filling of a mould with a heat curable composition.

Figure 2 illustrates the draining of such mould.

Figure 3 illustrates preliminary curing of the material clinging to the inner walls of the mould by a suitable heating device such as the infrared lighting banks shown.

Figure 4 illustrates a second filling of the mould.

Figure 5 illustrates controllable heating of a predetermined portion of the mould.

Figure 6 illustrates draining of the mould after the operation of Figure 5.

Figure 7 illustrates secondary curing after the draining stage of Figure 6.

Figure 8 illustrates an optional step of spraying the interior of the article within the mould with a suitable coating material such as a flock.

Figure 9 illustrates a baking oven employed for final curing of the article within the mould.

Referring in more detail to the drawings, a process will be outlined for the production of footwear, such as a child's rubber boot.

Although any suitable relatively uniform walled mould may be employed it is preferred herein to first make a form corresponding to the outer contours of the desired article which may be painted with "Aquadag," such material being a colloidal suspension of graphite well known in the radio tube manufacturing arts, particularly in the graphitic coating of the inner surface of the walls of glass cathode ray tubes. After the form is coated with this composition it is electro-plated preferably with nickel or other suitable metal to provide a mould wall of uniform thickness sufficient to give the necessary strength. The form is then removed and the completed mould may be employed in the method disclosed hereinafter.

Although various heat curable materials which are initially fluid in character may be employed in the present process, such as some of the rubber compounds, rubber latices, or resilient synthetic plastic compounds, it is desirable to illustrate the composition of one material which is suitable for fabricating articles according to the invention. One suitable formula is as follows:

| | Parts by weight |
|---|---|
| Synthetic resin, copolymer of vinyl chloride acetate | 100 |
| Plasticizer, organic ester type such as di-2-ethyl hexyl phthalate, dioctyl phthalate | 72 |
| Fillers or colourants, whiting or any other suitable materials compatible with the resin plasticizer | 7 |
| Stabilizer, dibasic lead phosphite | 5 |
| Total | 184 |

Referring to the drawings, a hollow mould 10 of the one-piece type as above described is filled with a relatively viscous heat-curable composition such as the type described above, the composition being stored in the reservoir 11 supported on frame 12 and being poured into the mould by means of a suitable spout 13. Any excess or drippings may drain by way of the draining trough 14 to a suitable receptacle 15. At this stage the mould may be suspended with the open end 16 thereof depending from a movable frame 17 having rollers 18 running along the guideways or tracks 19. The viscous material drains out of the mould into the draining trough 20 and suitable receptacle 21 associated with the frame 22.

The movable frame 17 passes through a suitable heating means 23 which may comprise banks of infra-red lamps 24 and 25 supported in the relatively open frame 26. The side walls of the mould 10 at this stage are preferably uniformly heated. The thin coating of material adhering to the inner walls of the mould is subjected to rapid heat penetration and is partially cured. At the end of this curing step, the material may be sufficiently cured to be withdrawn from the mould through the filling opening thereof, provided a thin-walled product in one coat is desired. However, in the majority of cases it is preferred to reinforce the article by further stages of similar treatment at preselected areas. In this case, however, it is preferable not to completely cure the inner surface of the material in the mould but leave it sufficiently adhesive for good bonding of re-inforcing layers.

The formation of a reinforced coating is illustrated in Figures 4 to 6 wherein the mould 10 is filled with viscous material from a reservoir 27 mounted on a frame 28 similar to the apparatus illustrated in Figure 1. In Figure 5, controlled curing for predetermined reinforcement of selected areas is illustrated wherein the mold is rested on a frame 29 and is shielded such as by a suitable shield 30 indicated by dotted lines whereby the exposed parts are subjected to heating by the lamps 31. In this case it will be observed that the mould is not drained previous to the curing step illustrated in Figure 5 and, therefore, heat penetration determines the depth of cure at the preselected areas. After this stage the mould 10 is suspended from a frame 32 similar to the frame 17 and drains excess and the viscous portion of the material therewithin into the trough 33 to a receptacle 34 associated with the fixed frame 35.

It will be appreciated that draining of the still viscous portion of the material within the mould 10 at the stage illustrated in Figure 6 leaves a thin coating over the partially cured portions of the article formed within the mould and this further coating is then partially cured in the heating apparatus 36 employing a bank of lamps 37 or other suitable heating means as before. After the stage of operation illustrated in Figure 7, the innermost coating has a surface characteristic which is relatively tacky or gummy. At this stage, therefore, as illustrated in Figure 8, the interior of the mould may be sprayed by means of a suitable spray device 38 of known construction with any desired coating material such as a flock. Thereafter the mould, suspended from the movable frame, passes through the baking oven 39 continuously moving therethrough being subjected to a heat of say 350° Fahrenheit for a period of time necessary and required to cure for maximum thickness of the material employed in the article. Frequently a period of five to ten minutes is used for one-eighth of an inch thickness, of the above illustrated composition. The finally cured article within the mould may then be removed after cooling without separating the mould by merely pulling the article through the filling opening, its elastic nature assisting in the removal from the mould.

Having regard to the above detailed description of the process herein as applied to a specific type of article, it is in order to disclose alternatives and variations in the method. It will be appreciated at the stage of operations illustrated in Figure 5 additional reinforcement of the article may be accomplished by inserting a fabric shape such as for the sole of the boot or the like. However, this should be done over the tacky inner surface of the article after the stage of treatment illustrated in Figure 3, or over an additional viscous coating or cement applied after this stage. Thereafter the article may go directly to the final curing oven 39. Since the walls of the article may be relatively thin in regions outside the reinforced areas, it may be preferred to place a further and final coating on the inner surfaces of the article by merely following the steps illustrated in Figures 1 to 3 before final cure. A difference of colouring may be introduced. Thus, in the composition above described, the outer covering of the final article or the first composition may be black or any other desired colour, and the final inner coating may be a flesh-like colour or other desired colouration. This is particularly desirable where a flesh colour flocking is desired in the interior of the article. Where reinforcement by fabric pieces is desired in a modified process of this type, such may be done after the second layer or coating has been partially cured.

It will be particularly observed in the process disclosed herein that the article is completely dried before removal from the mould, that is, it is completely cured. This is a distinct advantage in handling in manufacturing processes in that the article is not subject to marking, deformation, or other damage, as in the case of a partially cured article being handled by the workman.

It will be appreciated that in the production of articles according to the present process the thickness of the wall of the finished article is controlled by heating during processing. Accordingly, it is not necessary to resort to spinning of the mould or other mechanical expedients to control the wall thickness. There is thus a greater facility afforded in the formation of unusual shaped articles. Moreover, one is not limited to the formation of an article having a uniform wall thickness throughout. Preferably the mould should have a relatively uniform wall thickness if a uniform wall thickness is desired in the final article and where uniform heating is employed. Obviously many types of heating devices may be employed to effect the necessary curing. Although infra-red lamp heating has been illustrated, any of the well known types of heating devices may be employed for heating the exterior surfaces of the mould.

It will be particulary observed that the general process herein relates to the formation of a hollow article from a heat curable composition which is elastic or yieldable in the cured state. That the material should be elastic is particularly desirable in the process herein for removal of the article from the mould. However, the term "elastic" is not intended to convey the meaning that the material of the article should be immediately recoverable to its cured form. This is particularly important when considering some of the synthetic materials which would be suitable, for their recovery period may be considerably longer than that normally experienced with elastic materials derived from rubber compositions.

What I claim as my invention is:

1. The method of wholly forming a hollow article in a hollow metal mould having an opening therein which comprises in combination: introducing into the mould through the opening thereof a liquid heat-curable composition which is elastic in the cured state, to substantially fill the mould with said composition to a depth corresponding to the depth of the article to be formed therewithin, heating the composition within said mould by applying heat to the exterior surfaces of the mould to effect heat transfer through the latter to partially cure and set a layer of the composition next the inner surfaces of the mould, heating preselected areas of the mould for a longer period of time than other areas thereof to cause a build-up of thickness of the partially cured layer formed therein for reinforcing said layer in regions corresponding to the preselected areas of the mould, removing from the mould excess composition which is still in the liquid state to leave therewithin a coating of partially cured composition reinforced at the selected areas to said predetermined thickness, thereafter applying heat to the mould to completely cure said coating to form an article therewithin, and removing the completely cured article through the opening of the mould.

2. The method according to claim 1 and the step of applying materials to free surfaces of the coating of partially cured composition within the mould before completely curing said coating and while the article is within the mould.

3. The method according to claim 1 and the step of applying a flocking material to at least a portion of the free surfaces of the coating of partially cured composition while the latter is within the mould and before heating of such coating to final cure.

4. The method according to claim 1 and the step of applying a further coating of composition of different colour than said first coating and to the free surfaces of the latter, and heating said further coating to a state of partial cure.

5. The method according to claim 1 in which the mould is continuously conveyed throughout all the operations set forth except when the article is removed from the mould.

6. The method according to claim 1 in which the mould is continuously conveyed throughout all the operations set forth except when the article is removed from the mould, and further steps of supporting the mould in an upright position with the filling opening thereof substantially uppermost before excess composition is poured therefrom, and tipping the mould to remove excess composition therefrom.

7. The method according to claim 1 wherein the mould is heated by infra-red radiation in air, and wherein the heating of the preselected areas of the mould is accomplished by shielding the mould against passage of radiation to the remaining areas thereof.

SYDNEY PORTER.

REFERENCES CITED

The following references are of record in the file of this patent:

UNITED STATES PATENTS

| Number | Name | Date |
|---|---|---|
| 1,518,062 | Glancy | Dec. 2, 1924 |
| 1,717,248 | Pestalozza | June 11, 1929 |
| 1,992,386 | Miller | Feb. 26, 1935 |
| 2,041,143 | Olson | May 19, 1936 |
| 2,181,247 | Montgomery | Nov. 28, 1939 |
| 2,473,723 | Nelson | June 21, 1949 |
| 2,476,993 | Milton | July 26, 1949 |
| 2,476,994 | Milton | July 26, 1949 |